(12) United States Patent
Turbeville et al.

(10) Patent No.: US 9,403,149 B2
(45) Date of Patent: Aug. 2, 2016

(54) PROMOTED SOLID PHOSPHORIC ACID CATALYSTS AND METHODS OF USE

(75) Inventors: Wayne Turbeville, Crestwood, KY (US); Greg Korynta, Louisville, KY (US)

(73) Assignee: Clariant Corpoation, Louisville, KY (US)

(*) Notice: Subject to any disclaimer, the term of this patent is extended or adjusted under 35 U.S.C. 154(b) by 876 days.

(21) Appl. No.: 13/238,332

(22) Filed: Sep. 21, 2011

(65) Prior Publication Data

US 2013/0072735 A1    Mar. 21, 2013

(51) Int. Cl.
| | |
|---|---|
| *B01J 21/02* | (2006.01) |
| *B01J 27/14* | (2006.01) |
| *B01J 27/16* | (2006.01) |
| *B01J 35/00* | (2006.01) |
| *B01J 35/02* | (2006.01) |
| *B01J 21/08* | (2006.01) |
| *B01J 37/03* | (2006.01) |
| *B01J 37/08* | (2006.01) |
| *B01J 23/20* | (2006.01) |
| *B01J 27/18* | (2006.01) |
| *B01J 27/182* | (2006.01) |
| *B01J 37/00* | (2006.01) |

(52) U.S. Cl.
CPC *B01J 21/08* (2013.01); *B01J 23/20* (2013.01); *B01J 27/18* (2013.01); *B01J 27/182* (2013.01); *B01J 35/0013* (2013.01); *B01J 37/0018* (2013.01); *B01J 37/038* (2013.01); *B01J 37/08* (2013.01); *B01J 2523/00* (2013.01)

(58) Field of Classification Search
CPC .......... B01J 27/14; B01J 27/18; B01J 27/182; B01J 27/186; B01J 27/195; B01J 27/198; B01J 27/199; B01J 21/02; B01J 21/063; B01J 21/066; B01J 27/16; B01J 27/1802; B01J 27/19; B01J 35/00; B01J 35/02
USPC ........................................ 502/208–211, 214
See application file for complete search history.

(56) References Cited

U.S. PATENT DOCUMENTS

| | | | |
|---|---|---|---|
| 2,569,092 A * | 9/1951 | Deering ........................ | 585/529 |
| 3,297,587 A * | 1/1967 | Scherhag et al. ............. | 502/204 |
| 5,011,999 A | 4/1991 | Bowman et al. | |
| 6,251,261 B1 * | 6/2001 | Kasztelan et al. ......... | 208/111.1 |
| 7,557,060 B2 | 7/2009 | Xu et al. | |
| 2006/0199984 A1 * | 9/2006 | Kuechler et al. .................. | 585/1 |

FOREIGN PATENT DOCUMENTS

| | | |
|---|---|---|
| CN | 1155547 C | 6/2004 |
| CN | 1157260 C | 7/2004 |

OTHER PUBLICATIONS

Martins, R. L. "Texture, Surface Acidic and Catalytic Properties of Niobium Phosphate", Catalysis Today, 5, (1989), pp. 483-491.
Tanabe, Kozo, "Catalytic Application of Niobium Compounds" Catalysis Today 78, (2003), pp. 65-77.
International Search Report and the Written Opinion of the International Searching Authority for PCT/US2012/052737 with Feb. 11, 2013 Date of Mailing.

* cited by examiner

*Primary Examiner* — Patricia L Hailey

(57) ABSTRACT

The present invention relates to solid phosphoric acid (SPA) catalysts, processes for making the catalysts, and processes for conversion of hydrocarbons using the catalysts, such as oligomerization of propylene. In an exemplary embodiment, the catalyst comprises a calcined extrudate of phosphoric acid, diatomaceous earth, and niobic acid. Methods for converting hydrocarbons to olefins comprise contacting a hydrocarbon feedstock with the catalyst at hydrocarbon conversion conditions.

13 Claims, 3 Drawing Sheets

US 9,403,149 B2

PROMOTED SOLID PHOSPHORIC ACID CATALYSTS AND METHODS OF USE

FIELD OF THE INVENTION

This invention relates generally to solid phosphoric acid (SPA) catalysts useful in the conversion of hydrocarbons, such as the oligomerization of propylene. In particular embodiments, the invention relates to calcined extrudates of phosphoric acid, diatomaceous earth, and a promoter. The invention further relates to methods for converting hydrocarbons to olefins comprising contacting a hydrocarbon feedstock with the promoted SPA catalyst.

BACKGROUND OF THE INVENTION

Solid phosphoric acid (SPA) catalysts are known for their usefulness in various hydrocarbon conversion processes, such as aromatic alkylation and olefin polymerization. However, there are many problems associated with the use of SPA catalysts. Typical commercial SPA catalysts do not last very long in commercial oligomerization processes because of problems relating to short runs due to deactivation or pressure build-up, or deactivation of the catalyst through the duration of the run. These problems lead to increased temperatures and decreased flow rates which become necessary to maintain conversion. In turn, higher temperatures result in undesirable by-products and increased rates of coking of the catalyst, and slower flow rates result in lower overall rates of production.

There continues to be a great need for catalysts that can operate at lower temperatures and higher flow rates for a longer period of time, resulting in higher conversion levels, lower deactivation rates, and overall higher efficiency in converting hydrocarbons into larger olefins.

SUMMARY OF THE INVENTION

It is an object of the invention to provide solid phosphoric acid (SPA) catalysts for use in hydrocarbon conversion processes and other processes that employ an acid catalyst, which have higher activity and improved stability compared to current commercial SPA catalysts.

An embodiment of the present invention provides a solid phosphoric acid catalyst comprising a calcined extrudate of a phosphorus source, a silicon source, and a promoter. In an exemplary embodiment, the phosphorus source comprises phosphoric acid, the silicon source comprises diatomaceous earth, and the promoter comprises niobic acid.

It is also an object of the present invention to provide processes for converting hydrocarbons using a catalyst having the characteristics described in the previous paragraph. In one embodiment, the process comprises providing a hydrocarbon feedstock at hydrocarbon conversion conditions and contacting the feedstock with the catalyst. A specific embodiment may comprise alkylating an aromatic hydrocarbon or oligomerizing an olefin, such as propylene or butylene.

DETAILED DESCRIPTION OF THE INVENTION

Figure 1:
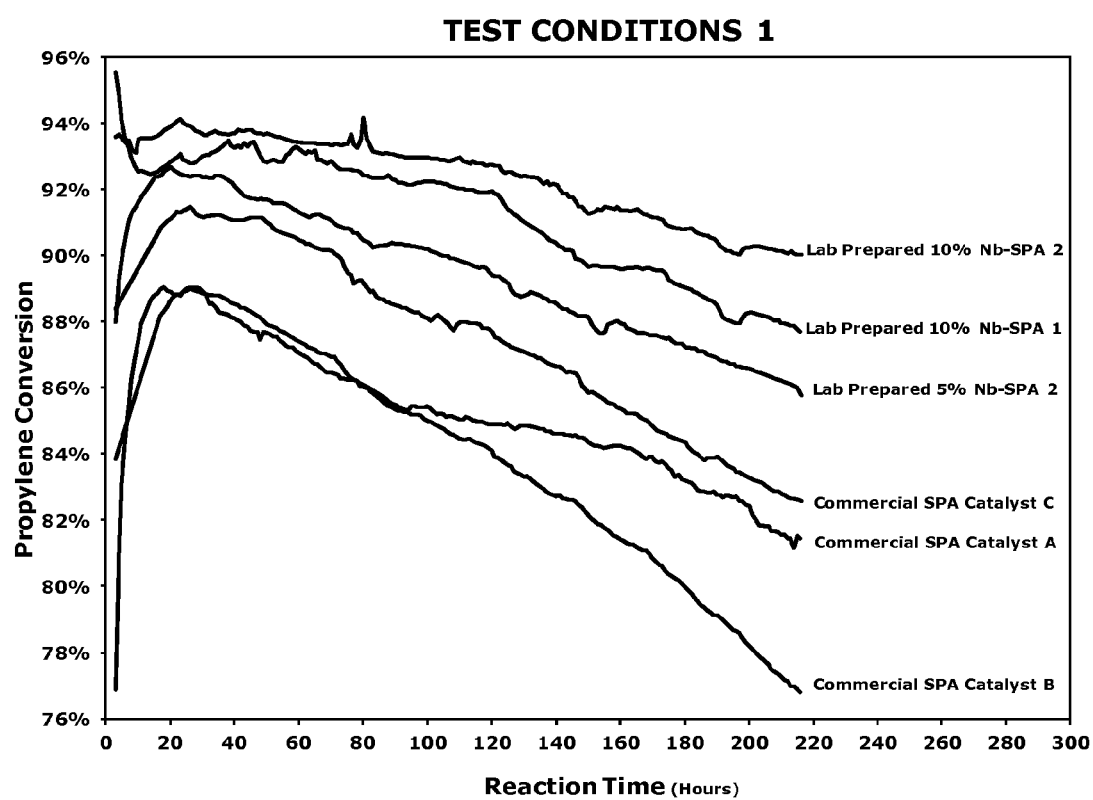
FIG. 1: Comparison of propylene oligomerization performance between niobium promoted SPA catalysts according to the present invention and commercial catalyst materials that were not promoted by niobic acid.

The applicants have discovered that the addition of a promoter, such as niobium oxide hydrate, in the preparation of a solid phosphoric acid (SPA) catalyst causes the catalyst to exhibit surprising improvements over current commercial catalysts when used in hydrocarbon conversion processes, such as in the conversion of propylene into larger olefins. In particular, the catalysts of the present invention demonstrate remarkably high conversion levels in the oligomerization of propylene, fast activation time, and low deactivation rates, when compared to catalyst materials that are not promoted, for instance, by niobic acid. The catalysts of the present invention may be used, for example, in processes for the oligomerization of olefins to polymer gasoline or higher olefins, alkylation of aromatics with olefins to give alkyl aromatics, and other types of hydrocarbon conversion processes.

The present invention provides a catalyst comprising a phosphorus source, a silicon source, and a promoter. The phosphorus source may comprise any phosphoric acid known in the art for use in SPA catalysts, a compound that forms phosphoric acid by hydrolysis, or any mixture thereof. Exemplary phosphorus sources include orthophosphoric acid $H_3PO_4$, pyrophosphoric acid $H_4P_2O_7$, or any mixture thereof. As is known in the art, the phosphoric acid may further be combined with water. In the present invention, the phosphoric acid has a preferred concentration between about 100% and about 120%.

The silicon source may be any siliceous or $SiO_2$-containing material generally known in the art for use in SPA catalysts. The silicon source may comprise either natural or artificial porous siliceous material. Exemplary silicon sources include, without limitation, diatomaceous earth, infusorial earth, ciliate earth, kieselguhr, kaolin, fuller's earth, artificial porous silica, or any mixture thereof. Diatomaceous earth, also referred to as kieselguhr (or guhr), is a natural mineral product composed mainly of silicon dioxide. According to particular aspects of the invention, following formation of the mixture into a shape (e.g., following extrusion) and calcination of the formed shape (e.g., calcination of the extrudate), the catalyst comprises silicon orthophosphate and, optionally, silicon pyrophosphate, and has an integrated XRD reflectance intensity ratio of silicon orthophosphate to silicon pyrophosphate of at least about 5:1.

In exemplary embodiments of the invention, the promoter comprises solid niobic acid $Nb_2O_5 \cdot xH_2O$. In alternative embodiments, the promoter comprises niobium, titanium, zirconium, tungsten, vanadium, chromium, molybdenum, aluminum, boron, or any mixture thereof. Other ingredients, including without limitation additional modifiers, binders, cements, or organic material, may be added to the catalyst mixture; for example, materials which produce gas during calcination may be added, such as those described in U.S. Pat. No. 7,557,060, which is herein incorporated by reference in its entirety.

A process of preparing an SPA catalyst according to the present invention comprises the steps of mixing a phosphorus source, a silicon source, and a promoter; forming the mixture into a shape; and calcining the formed shape. Although the SPA catalysts of this invention may be manufactured in a variety of forms, such as extrudates, pellets, tablets, and spheres, and by a variety of methods, such as by extrusion, pelletizing, or marumarizing, the preferred form is an extrudate. Extrusion allows the catalyst to be manufactured in various shapes and it is believed that important properties are easier to control if the catalyst composite is in extrudate form. Also, extrusion is typically an efficient and cheap method of producing a formed catalyst particle. Thus, in an exemplary embodiment, a process according to the present invention comprises the steps of mixing a phosphorus source, a silicon source, and a promoter; extruding the mixture to form an extrudate; and calcining the extrudate.

One embodiment provides a process comprising the step of mixing the phosphorus source, silicon source, and promoter at a temperature of about 10° C. to about 250° C., with the phosphorus source and the silicon source present in the mixture in a ratio of about 2:1 to about 4:1, preferably about 3:1. In exemplary embodiments, the materials used to produce the catalyst comprise (or consist essentially of) phosphoric acid at a concentration of about 113%, diatomaceous earth (i.e., guhr), and hydrated niobic acid, $Nb_2O_5 \cdot xH_2O$.

According to one embodiment, the promoter is added to the starting mixture in a concentration range of about 1% to about 20% w/w of the silicon source (e.g., diatomaceous earth). Alternative embodiments comprise adding the promoter in a concentration range of about 2% to about 15% w/w of the silicon source, about 3% to about 12% w/w of the silicon source, or about 5% to about 10% w/w of the silicon source. In particular embodiments, the promoter is added at a concentration of about 1%, about 2.5%, about 5%, about 7.5%, about 10%, about 12.5%, about 15%, about 17.5%, or about 20% w/w of the silicon source. The promoter may alternatively be added to the starting mixture at a concentration greater than about 20% w/w of the silicon source, for example, at concentrations of about 25%, about 30%, or about 35% w/w of the silicon source; however, as one of ordinary skill in the art will recognize, concentrations of promoter greater than about 20% w/w of the silicon source tend to become cost prohibitive for commercial production. In an exemplary embodiment, the promoter is added at a concentration of about 10% w/w of the diatomaceous earth in the mixture, so that the mixture comprises a ratio of about 3/0.9/0.1 of phosphoric acid/diatomaceous earth/hydrated niobic acid. The mixture is preferably extruded to form an extrudate and can be calcined before extrusion, after extrusion, or both before and after extrusion. In an exemplary embodiment, the extrudate is calcined after extrusion at a temperature of about 200° C. to about 500° C., preferably about 300° C. to about 350° C. In particular embodiments, the process results in mostly silicon orthosilicate, and free acidity that is usually about 25% $P_2O_5$.

Crystallization of niobium phosphate does not occur until much higher temperatures (>800° C.), and it is usual that niobium phosphate would be amorphous at these conditions. Without being bound to any theory, it is believed that the niobic acid promoter may not completely react with the phosphoric acid and is still partially in the form of niobic acid, which is normally amorphous. Any reacted niobium is believed to be in the form of amorphous niobium phosphate. Thus, according to some embodiments, the catalysts comprise amorphous niobic acid, amorphous niobium phosphate, silicon orthosilicate, and free acidity comprising $P_2O_5$.

Another embodiment of the invention provides a process of converting hydrocarbons comprising providing a hydrocarbon feedstock at hydrocarbon conversion conditions and contacting the feedstock with a catalyst of the present invention as described above. In particular embodiments, the process of converting hydrocarbons comprises alkylating an aromatic hydrocarbon or oligomerizing an olefin, such as propylene. As is known in the art, the hydrocarbon feedstock may comprise water.

The Nb-promoted SPA catalysts of the present invention were found to have superior performance compared to commercial state-of-the-art catalysts, particularly with regard to conversion level of propylene into larger olefins. Surprisingly, the Nb-promoted SPA catalysts of the present invention had much faster activation than the reference catalysts, being close to normal conversion after about 2 hours instead of the expected 14-17 hours that are normally required, and also had higher conversion levels and significantly lower deactivation rates than current commercial catalysts, as described below and illustrated in FIG. 1.

In some embodiments, a catalyst of the present invention is prepared under conditions effective to cause the catalyst to exhibit a much faster activation time (i.e., measured from the time that the hydrocarbon feedstock is contacted with the catalyst to the start of normal hydrocarbon conversion) than reference catalysts (i.e., catalysts without a niobium promoter), particularly in the oligomerization of propylene under the "Test Conditions 1" described below in Table 1. For example, as illustrated in FIG. 1 and Table 2 below, the catalyst is prepared under conditions effective to cause the catalyst to exhibit an activation time of less than about 14 hours, preferably less than about 10 hours, and most preferably less than about 5 hours. In exemplary embodiments, the catalyst is prepared under conditions effective to cause the catalyst to exhibit an activation time within about 0.5 to about 5 hours, preferably within about 1 to about 3 hours, and most preferably within about 2 hours. In other embodiments, a catalyst of the present invention is prepared under conditions effective to cause the catalyst to exhibit a conversion rate of hydrocarbon feedstock (e.g., propylene) into larger olefins, particularly under the "Test Conditions 1" described below in Table 1, of at least about 92% after about 60 hours to about 120 hours of reaction time, at least about 90% after about 100 hours to about 180 hours of reaction time, or at least about 86% conversion after about 170 hours to about 220 hours of reaction time. Additional activation times and conversion rates of the present invention under "Test Conditions 1" are provided in Table 2 and FIG. 1.

The following examples are provided to describe the invention in greater detail and are intended to illustrate, not limit, the invention.

EXAMPLES

Example 1

Six catalysts (three Nb-SPA catalysts according to the present invention and three commercial reference catalysts) were prepared and tested in a standard propylene oligomerization performance test.

(1) Lab-Prepared 10% Nb-SPA 1. A sample of 106.8 g phosphoric acid of 113% concentration was heated to 45° C. To this was added 37.5 g kieselguhr and 4.1 g niobic acid. The kieselguhr and acid were blended using a high-speed mechanical mixer for several minutes. After blending, the "green" mixture was extruded using a hydraulic press. The extrudates were calcined in air at 320° C. for 25 minutes.

(2) Lab-Prepared 10% Nb-SPA 2. A sample of 102.3 g phosphoric acid of 113% concentration was heated to 45° C. To this was added 35.9 g kieselguhr, 4.0 g niobic acid, and 1.2 g maize flour. The kieselguhr and acid were blended using a high-speed mechanical mixer for several minutes. After blending, the "green" mixture was extruded using a hydraulic press. The extrudates were calcined in air at 320° C. for 25 minutes.

(3) Lab-Prepared 5% Nb-SPA 2. A sample of 108.0 g phosphoric acid of 113% concentration was heated to 45° C. To this was added 40.0 g kieselguhr, 2.1 g niobic acid, and 1.3 g maize flour. The kieselguhr and acid were blended using a high-speed mechanical mixer for several minutes. After blending, the "green" mixture was extruded using a hydraulic press. The extrudates were calcined in air at 320° C. for 25 minutes.

Three reference commercial products were also tested in the propylene oligomerization performance test: Commercial SPA Catalyst A, Commercial SPA Catalyst B, and Commercial SPA Catalyst C. Commercial SPA Catalyst C was the previously most stable performing catalyst of the prior art.

The six catalysts described above were tested in a standard propylene oligomerization performance test under "Test Conditions 1" described in Table 1 below.

TABLE 1

| CONDITIONS | TEST CONDITIONS 1 | TEST CONDITIONS 2 |
|---|---|---|
| LIQUID HOURLY SPACE VELOCITY, hr$^{-1}$ | 2.8 | 2.8 |
| TEMPERATURE, ° C. | 215 | 180 |
| PRESSURE, bar | 65 | 65 |
| FEED COMPOSITION | 45/55 propane/propylene | 50/50 propane/propylene |
| HYDRATION LEVEL, ppm | 510 | 1025 |

The results of the performance test are provided in FIG. 1 and Tables 2 and 3 below, which provide the percentage of propylene conversion relative to hours of reaction time. The niobium promoted SPA catalysts prepared according to the present invention, namely, Lab-Prepared 10% Nb-SPA 1, Lab-Prepared 10% Nb-SPA 2, and Lab-Prepared 5% Nb-SPA 2, exhibited superior performance compared to all of the reference catalysts with regard to conversion level of propylene into larger olefins and deactivation rate. As can be seen from the performance data, the 10% Nb-promoted SPA catalysts had much faster activation than the reference catalysts, being close to normal conversion after about 2 hours instead of the expected 14-17 hours that are normally required. The Nb-promoted SPA catalysts also had a higher conversion level than any of the Commercial SPA Catalysts, which represent the prior state of the art. Furthermore, it was observed that the deactivation rate of the Nb-promoted catalyst was significantly lower compared to the commercial catalysts. As a comparison, the previously most stable performing catalyst of the prior art, Commercial SPA Catalyst C, had a deactivation rate roughly twice that for the Nb-promoted catalyst.

Figure 3:
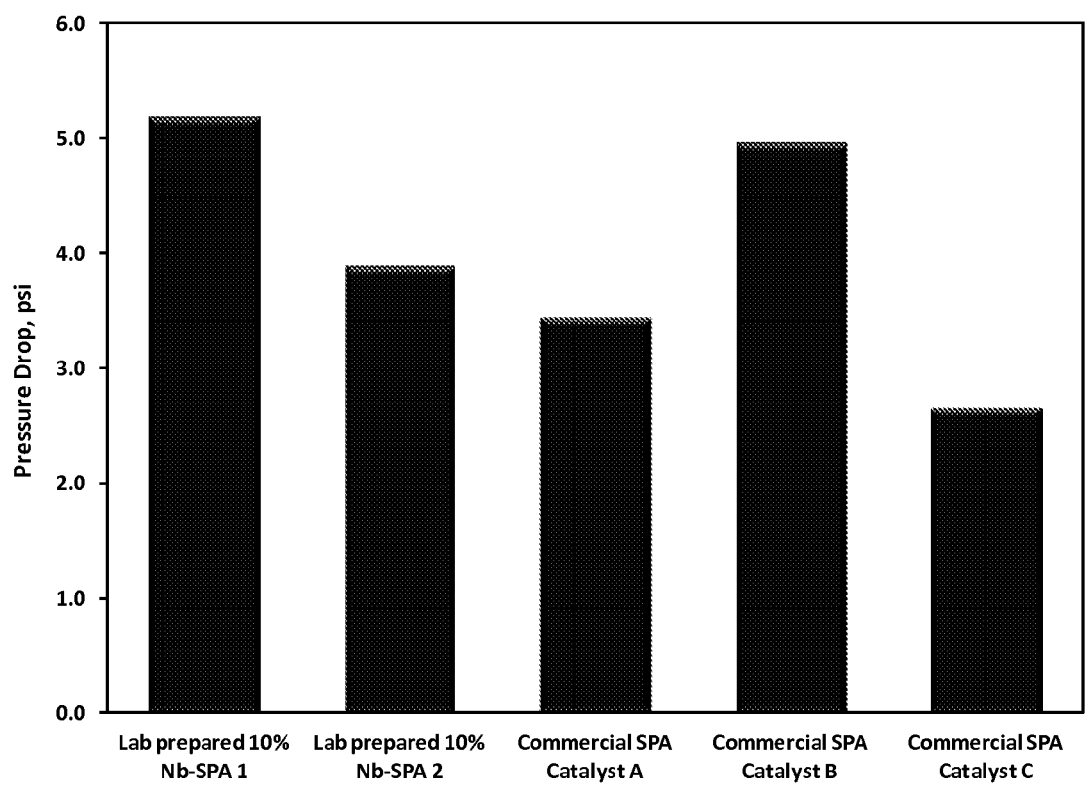
FIG. 3: Comparison of the pressure drop that occurred in the test reactor following propylene oligomerization using niobium promoted SPA catalysts according to the present invention and catalyst materials that were not promoted by niobic acid.

The relative physical stability of each catalyst was assessed by measuring the pressure drop across the laboratory test reactor after the completion of the activity test. The pressure drop indicates the amount of blockage that occurred during the test due to carbon build-up, swelling of the extrudates, and/or disintegration of the extrudates into finer particles. FIG. 3 summarizes the relative pressure drop of the catalysts. The Nb-promoted catalysts did not result in high pressure drops during the reaction due to coking, swelling, or disintegration.

TABLE 2

Results of Propylene Conversion Test Under "Test Conditions 1"

| (hr) | Lab Prepared 10% Nb-SPA 1 | (hr) | Lab Prepared 10% Nb-SPA 2 | (hr) | Lab Prepared 5% Nb SPA 2 |
|---|---|---|---|---|---|
| 3.0 | 95.5% | 3.2 | 93.6% | 3.2 | 88.0% |
| 4.0 | 94.8% | 4.2 | 93.7% | 4.2 | 89.3% |
| 5.0 | 94.1% | 5.2 | 93.5% | 5.2 | 90.1% |
| 6.0 | 93.6% | 6.2 | 93.4% | 6.2 | 90.7% |
| 7.0 | 93.3% | 7.2 | 93.5% | 7.2 | 91.0% |
| 8.0 | 93.0% | 8.2 | 93.2% | 8.2 | 91.3% |
| 9.0 | 92.7% | 9.2 | 93.1% | 9.2 | 91.5% |
| 10.0 | 92.5% | 10.2 | 93.5% | 10.2 | 91.6% |
| 11.0 | 92.6% | 11.2 | 93.6% | 11.2 | 91.8% |
| 14.0 | 92.5% | 14.2 | 93.5% | 12.2 | 91.9% |
| 15.0 | 92.5% | 15.2 | 93.6% | 15.2 | 92.4% |
| 16.0 | 92.5% | 16.2 | 93.6% | 16.2 | 92.4% |
| 17.0 | 92.6% | 17.2 | 93.7% | 17.2 | 92.4% |
| 18.0 | 92.7% | 18.2 | 93.8% | 18.2 | 92.6% |
| 19.0 | 92.7% | 19.2 | 93.9% | 19.2 | 92.6% |
| 20.0 | 92.8% | 20.2 | 93.9% | 20.2 | 92.7% |
| 21.0 | 92.9% | 21.2 | 94.0% | 21.2 | 92.6% |
| 22.0 | 93.0% | 22.2 | 94.0% | 22.2 | 92.5% |
| 23.0 | 93.1% | 23.2 | 94.1% | 23.2 | 92.5% |
| 24.0 | 92.9% | 24.2 | 94.0% | 24.2 | 92.4% |
| 25.0 | 92.9% | 25.2 | 93.9% | 25.2 | 92.4% |
| 26.0 | 92.8% | 26.2 | 93.9% | 26.2 | 92.4% |
| 27.0 | 92.8% | 27.2 | 93.8% | 27.2 | 92.4% |
| 28.0 | 92.8% | 28.2 | 93.8% | 28.2 | 92.4% |
| 29.0 | 92.9% | 29.2 | 93.7% | 29.2 | 92.4% |
| 30.0 | 93.0% | 30.2 | 93.6% | 30.2 | 92.4% |
| 31.0 | 93.0% | 31.2 | 93.6% | 31.2 | 92.4% |
| 32.0 | 93.0% | 32.2 | 93.7% | 32.2 | 92.3% |
| 33.0 | 93.1% | 33.2 | 93.7% | 33.2 | 92.4% |
| 34.0 | 93.1% | 34.2 | 93.8% | 34.2 | 92.4% |
| 35.0 | 93.2% | 35.2 | 93.7% | 35.2 | 92.4% |
| 38.0 | 93.5% | 38.2 | 93.7% | 36.2 | 92.4% |
| 39.0 | 93.3% | 39.2 | 93.7% | 39.2 | 92.2% |
| 40.0 | 93.2% | 40.2 | 93.7% | 40.2 | 92.1% |
| 41.0 | 93.3% | 41.2 | 93.8% | 41.2 | 92.0% |
| 42.0 | 93.3% | 42.2 | 93.8% | 42.2 | 91.9% |
| 43.0 | 93.4% | 43.2 | 93.8% | 43.2 | 91.8% |
| 44.0 | 93.3% | 44.2 | 93.8% | 44.2 | 91.8% |
| 45.0 | 93.4% | 45.2 | 93.8% | 45.2 | 91.7% |
| 46.0 | 93.4% | 46.2 | 93.7% | 46.2 | 91.7% |
| 47.0 | 93.2% | 47.2 | 93.7% | 47.2 | 91.7% |
| 48.0 | 93.0% | 48.2 | 93.7% | 48.2 | 91.7% |
| 49.0 | 92.9% | 49.2 | 93.6% | 49.2 | 91.7% |
| 50.0 | 92.8% | 50.2 | 93.7% | 50.2 | 91.7% |
| 51.0 | 92.9% | 51.2 | 93.6% | 51.2 | 91.6% |
| 52.0 | 92.9% | 52.2 | 93.6% | 52.2 | 91.6% |
| 53.0 | 92.9% | 53.2 | 93.6% | 53.2 | 91.6% |
| 54.0 | 92.8% | 54.2 | 93.6% | 54.2 | 91.6% |
| 55.0 | 92.8% | 55.2 | 93.5% | 55.2 | 91.6% |
| 56.0 | 93.0% | 56.2 | 93.5% | 56.2 | 91.5% |
| 57.0 | 93.1% | 57.2 | 93.5% | 57.2 | 91.5% |
| 58.0 | 93.2% | 58.2 | 93.4% | 58.2 | 91.4% |
| 59.0 | 93.3% | 59.2 | 93.5% | 59.2 | 91.4% |
| 62.0 | 93.1% | 62.2 | 93.4% | 60.2 | 91.3% |
| 63.0 | 93.1% | 63.2 | 93.4% | 63.2 | 91.2% |
| 64.0 | 93.1% | 64.2 | 93.4% | 64.2 | 91.2% |
| 65.0 | 93.2% | 65.2 | 93.4% | 65.2 | 91.2% |
| 66.0 | 92.9% | 66.2 | 93.4% | 66.2 | 91.3% |
| 67.0 | 92.9% | 67.2 | 93.4% | 67.2 | 91.2% |
| 68.0 | 92.8% | 68.2 | 93.4% | 68.2 | 91.1% |
| 69.0 | 92.8% | 69.2 | 93.3% | 69.2 | 91.1% |
| 70.0 | 92.8% | 70.2 | 93.3% | 70.2 | 91.0% |
| 71.0 | 92.7% | 71.2 | 93.3% | 71.2 | 91.0% |
| 72.0 | 92.7% | 72.2 | 93.4% | 72.2 | 90.9% |
| 73.0 | 92.6% | 73.2 | 93.3% | 73.2 | 90.9% |
| 74.0 | 92.6% | 74.2 | 93.4% | 74.2 | 90.8% |
| 75.0 | 92.6% | 75.2 | 93.4% | 75.2 | 90.8% |
| 76.0 | 92.6% | 76.2 | 93.6% | 76.2 | 90.8% |
| 77.0 | 92.6% | 77.2 | 93.4% | 77.2 | 90.7% |
| 78.0 | 92.6% | 78.2 | 93.3% | 78.2 | 90.7% |
| 79.0 | 92.5% | 79.2 | 93.5% | 79.2 | 90.5% |
| 80.0 | 92.4% | 80.2 | 94.2% | 80.2 | 90.5% |
| 81.0 | 92.4% | 81.2 | 93.5% | 81.2 | 90.4% |
| 82.0 | 92.4% | 82.2 | 93.3% | 82.2 | 90.3% |
| 83.0 | 92.4% | 83.2 | 93.2% | 83.2 | 90.2% |

TABLE 2-continued

Results of Propylene Conversion Test Under "Test Conditions 1"

| (hr) | Lab Prepared 10% Nb-SPA 1 | (hr) | Lab Prepared 10% Nb-SPA 2 | (hr) | Lab Prepared 5% Nb SPA 2 |
|---|---|---|---|---|---|
| 86.0 | 92.3% | 86.2 | 93.1% | 84.2 | 90.3% |
| 87.0 | 92.4% | 87.2 | 93.1% | 87.2 | 90.3% |
| 88.0 | 92.4% | 88.2 | 93.1% | 88.2 | 90.4% |
| 89.0 | 92.3% | 89.2 | 93.1% | 89.2 | 90.4% |
| 90.0 | 92.3% | 90.2 | 93.0% | 90.2 | 90.4% |
| 91.0 | 92.2% | 91.2 | 93.0% | 91.2 | 90.4% |
| 92.0 | 92.2% | 92.2 | 93.0% | 92.2 | 90.3% |
| 93.0 | 92.2% | 93.2 | 93.0% | 93.2 | 90.3% |
| 94.0 | 92.1% | 94.2 | 93.0% | 94.2 | 90.3% |
| 95.0 | 92.1% | 95.2 | 93.0% | 95.2 | 90.3% |
| 96.0 | 92.2% | 96.2 | 93.0% | 96.2 | 90.3% |
| 97.0 | 92.2% | 97.2 | 93.0% | 97.2 | 90.2% |
| 98.0 | 92.2% | 98.2 | 93.0% | 98.2 | 90.2% |
| 99.0 | 92.2% | 99.2 | 93.0% | 99.2 | 90.2% |
| 100.0 | 92.2% | 100.2 | 92.9% | 100.2 | 90.2% |
| 101.0 | 92.2% | 101.2 | 92.9% | 101.2 | 90.1% |
| 102.0 | 92.2% | 102.2 | 92.9% | 102.2 | 90.1% |
| 103.0 | 92.2% | 103.2 | 92.9% | 103.2 | 90.1% |
| 104.0 | 92.2% | 104.2 | 92.9% | 104.2 | 90.0% |
| 105.0 | 92.2% | 105.2 | 92.9% | 105.2 | 90.0% |
| 106.0 | 92.1% | 106.2 | 92.9% | 106.2 | 90.0% |
| 107.0 | 92.1% | 107.2 | 92.8% | 107.2 | 89.9% |
| 110.0 | 92.0% | 110.2 | 92.9% | 108.2 | 89.9% |
| 111.0 | 92.0% | 111.2 | 92.9% | 111.2 | 89.8% |
| 112.0 | 92.0% | 112.2 | 92.8% | 112.2 | 89.8% |
| 113.0 | 92.0% | 113.2 | 92.8% | 113.2 | 89.7% |
| 114.0 | 92.0% | 114.2 | 92.9% | 114.2 | 89.7% |
| 115.0 | 91.9% | 115.2 | 92.8% | 115.2 | 89.7% |
| 116.0 | 91.9% | 116.2 | 92.8% | 116.2 | 89.6% |
| 117.0 | 91.9% | 117.2 | 92.8% | 117.2 | 89.6% |
| 118.0 | 91.9% | 118.2 | 92.7% | 118.2 | 89.6% |
| 119.0 | 91.9% | 119.2 | 92.7% | 119.2 | 89.5% |
| 120.0 | 91.9% | 120.2 | 92.7% | 120.2 | 89.4% |
| 121.0 | 91.9% | 121.2 | 92.7% | 121.2 | 89.4% |
| 122.0 | 91.8% | 122.2 | 92.7% | 122.2 | 89.4% |
| 123.0 | 91.7% | 123.2 | 92.6% | 123.2 | 89.3% |
| 124.0 | 91.5% | 124.2 | 92.5% | 124.2 | 89.2% |
| 125.0 | 91.4% | 125.2 | 92.5% | 125.2 | 89.1% |
| 126.0 | 91.3% | 126.2 | 92.5% | 126.2 | 89.0% |
| 127.0 | 91.3% | 127.2 | 92.5% | 127.2 | 88.8% |
| 128.0 | 91.2% | 128.2 | 92.4% | 128.2 | 88.8% |
| 129.0 | 91.1% | 129.2 | 92.4% | 129.2 | 88.7% |
| 130.0 | 91.0% | 130.2 | 92.4% | 130.2 | 88.8% |
| 131.0 | 91.0% | 131.2 | 92.4% | 131.2 | 88.8% |
| 134.0 | 90.8% | 134.2 | 92.4% | 132.2 | 88.9% |
| 135.0 | 90.7% | 135.2 | 92.3% | 135.2 | 88.8% |
| 136.0 | 90.6% | 136.2 | 92.2% | 136.2 | 88.7% |
| 137.0 | 90.6% | 137.2 | 92.3% | 137.2 | 88.7% |
| 138.0 | 90.5% | 138.2 | 92.1% | 138.2 | 88.6% |
| 139.0 | 90.4% | 139.2 | 92.2% | 139.2 | 88.6% |
| 140.0 | 90.4% | 140.2 | 92.1% | 140.2 | 88.5% |
| 141.0 | 90.3% | 141.2 | 92.0% | 141.2 | 88.4% |
| 142.0 | 90.2% | 142.2 | 91.9% | 142.2 | 88.4% |
| 143.0 | 90.2% | 143.2 | 91.9% | 143.2 | 88.4% |
| 144.0 | 90.2% | 144.2 | 91.8% | 144.2 | 88.3% |
| 145.0 | 90.1% | 145.2 | 91.8% | 145.2 | 88.3% |
| 146.0 | 89.9% | 146.2 | 91.6% | 146.2 | 88.2% |
| 147.0 | 89.9% | 147.2 | 91.5% | 147.2 | 88.2% |
| 148.0 | 89.9% | 148.2 | 91.5% | 148.2 | 88.2% |
| 149.0 | 89.8% | 149.2 | 91.3% | 149.2 | 88.2% |
| 150.0 | 89.6% | 150.2 | 91.3% | 150.2 | 88.1% |
| 151.0 | 89.7% | 151.2 | 91.3% | 151.2 | 87.9% |
| 152.0 | 89.7% | 152.2 | 91.3% | 152.2 | 87.8% |
| 153.0 | 89.7% | 153.2 | 91.4% | 153.2 | 87.7% |
| 154.0 | 89.7% | 154.2 | 91.4% | 154.2 | 87.6% |
| 155.0 | 89.7% | 155.2 | 91.5% | 155.2 | 87.7% |
| 158.0 | 89.7% | 158.2 | 91.4% | 156.2 | 87.9% |
| 159.0 | 89.6% | 159.2 | 91.5% | 159.2 | 88.0% |
| 160.0 | 89.6% | 160.2 | 91.4% | 160.2 | 88.0% |
| 161.0 | 89.6% | 161.2 | 91.4% | 161.2 | 87.9% |
| 162.0 | 89.6% | 162.2 | 91.4% | 162.2 | 87.8% |
| 163.0 | 89.6% | 163.2 | 91.3% | 163.2 | 87.8% |
| 164.0 | 89.6% | 164.2 | 91.4% | 164.2 | 87.7% |
| 165.0 | 89.6% | 165.2 | 91.4% | 165.2 | 87.6% |
| 166.0 | 89.6% | 166.2 | 91.3% | 166.2 | 87.7% |
| 167.0 | 89.6% | 167.2 | 91.3% | 167.2 | 87.7% |
| 168.0 | 89.6% | 168.2 | 91.2% | 168.2 | 87.6% |
| 169.0 | 89.6% | 169.2 | 91.2% | 169.2 | 87.6% |
| 170.0 | 89.6% | 170.2 | 91.1% | 170.2 | 87.6% |
| 171.0 | 89.5% | 171.2 | 91.2% | 171.2 | 87.6% |
| 172.0 | 89.6% | 172.2 | 91.1% | 172.2 | 87.5% |
| 173.0 | 89.5% | 173.2 | 91.1% | 173.2 | 87.5% |
| 174.0 | 89.5% | 174.2 | 90.9% | 174.2 | 87.5% |
| 175.0 | 89.3% | 175.2 | 90.9% | 175.2 | 87.5% |
| 176.0 | 89.2% | 176.2 | 90.9% | 176.2 | 87.4% |
| 177.0 | 89.1% | 177.2 | 90.8% | 177.2 | 87.3% |
| 178.0 | 89.1% | 178.2 | 90.8% | 178.2 | 87.3% |
| 179.0 | 89.1% | 179.2 | 90.8% | 179.2 | 87.3% |
| 182.0 | 89.0% | 182.2 | 90.8% | 180.2 | 87.2% |
| 183.0 | 88.9% | 183.2 | 90.7% | 183.2 | 87.2% |
| 184.0 | 88.9% | 184.2 | 90.7% | 184.2 | 87.1% |
| 185.0 | 88.8% | 185.2 | 90.7% | 185.2 | 87.1% |
| 186.0 | 88.8% | 186.2 | 90.6% | 186.2 | 87.1% |
| 187.0 | 88.7% | 187.2 | 90.6% | 187.2 | 87.0% |
| 188.0 | 88.6% | 188.2 | 90.5% | 188.2 | 87.0% |
| 189.0 | 88.6% | 189.2 | 90.5% | 189.2 | 86.9% |
| 190.0 | 88.5% | 190.2 | 90.4% | 190.2 | 86.9% |
| 191.0 | 88.3% | 191.2 | 90.3% | 191.2 | 86.8% |
| 192.0 | 88.1% | 192.2 | 90.2% | 192.2 | 86.8% |
| 193.0 | 88.1% | 193.2 | 90.1% | 193.2 | 86.8% |
| 194.0 | 88.0% | 194.2 | 90.1% | 194.2 | 86.7% |
| 195.0 | 88.0% | 195.2 | 90.1% | 195.2 | 86.7% |
| 196.0 | 88.0% | 196.2 | 90.1% | 196.2 | 86.6% |
| 197.0 | 88.0% | 197.2 | 90.0% | 197.2 | 86.6% |
| 198.0 | 88.1% | 198.2 | 90.2% | 198.2 | 86.6% |
| 199.0 | 88.2% | 199.2 | 90.2% | 199.2 | 86.6% |
| 200.0 | 88.3% | 200.2 | 90.3% | 200.2 | 86.6% |
| 201.0 | 88.3% | 201.2 | 90.3% | 201.2 | 86.5% |
| 202.0 | 88.2% | 202.2 | 90.3% | 202.2 | 86.5% |

TABLE 3

Results of Propylene Conversion Test Under "Test Conditions 1"

| (hr) | Commercial SPA Catalyst A | (hr) | Commercial SPA Catalyst B | (hr) | Commercial SPA Catalyst C |
|---|---|---|---|---|---|
| 3.0 | 76.9% | 3.0 | 83.8% | 3.2 | 88.4% |
| 4.0 | 81.0% | 17.0 | 88.2% | 17.2 | 90.9% |
| 5.0 | 83.1% | 18.0 | 88.3% | 18.2 | 91.0% |
| 6.0 | 84.4% | 19.0 | 88.4% | 19.2 | 91.0% |
| 7.0 | 85.5% | 20.0 | 88.6% | 20.2 | 91.1% |
| 8.0 | 86.3% | 21.0 | 88.8% | 21.2 | 91.2% |
| 9.0 | 86.9% | 22.0 | 88.8% | 22.2 | 91.3% |
| 10.0 | 87.4% | 23.0 | 88.8% | 23.2 | 91.3% |
| 11.0 | 87.9% | 24.0 | 88.9% | 24.2 | 91.4% |
| 14.0 | 88.7% | 25.0 | 88.9% | 25.2 | 91.4% |
| 15.0 | 88.8% | 26.0 | 89.0% | 26.2 | 91.5% |
| 16.0 | 88.9% | 27.0 | 89.0% | 27.2 | 91.4% |
| 17.0 | 89.0% | 28.0 | 88.9% | 28.2 | 91.3% |
| 18.0 | 89.0% | 29.0 | 88.9% | 29.2 | 91.2% |
| 19.0 | 88.9% | 30.0 | 88.9% | 30.2 | 91.1% |
| 20.0 | 88.9% | 31.0 | 88.8% | 31.2 | 91.2% |
| 21.0 | 88.8% | 34.0 | 88.8% | 34.2 | 91.2% |
| 22.0 | 88.8% | 35.0 | 88.8% | 35.2 | 91.2% |
| 23.0 | 88.8% | 38.0 | 88.6% | 36.2 | 91.2% |
| 24.0 | 88.9% | 39.0 | 88.6% | 37.2 | 91.1% |
| 25.0 | 89.0% | 40.0 | 88.5% | 38.2 | 91.1% |
| 26.0 | 89.0% | 41.0 | 88.5% | 39.2 | 91.1% |
| 27.0 | 89.0% | 42.0 | 88.4% | 40.2 | 91.1% |
| 28.0 | 89.1% | 43.0 | 88.4% | 41.2 | 91.1% |
| 29.0 | 89.0% | 44.0 | 88.4% | 42.2 | 91.1% |
| 30.0 | 88.9% | 45.0 | 88.3% | 43.2 | 91.1% |
| 31.0 | 88.8% | 46.0 | 88.2% | 44.2 | 91.1% |
| 32.0 | 88.5% | 47.0 | 88.2% | 45.2 | 91.2% |
| 33.0 | 88.6% | 48.0 | 88.1% | 46.2 | 91.2% |

TABLE 3-continued

Results of Propylene Conversion Test Under "Test Conditions 1"

| (hr) | Commercial SPA Catalyst A | (hr) | Commercial SPA Catalyst B | (hr) | Commercial SPA Catalyst C | (hr) | Commercial SPA Catalyst A | (hr) | Commercial SPA Catalyst B | (hr) | Commercial SPA Catalyst C |
|---|---|---|---|---|---|---|---|---|---|---|---|
| 34.0 | 88.4% | 49.0 | 88.0% | 47.2 | 91.2% | 116.0 | 85.0% | 137.0 | 82.9% | 127.2 | 87.2% |
| 35.0 | 88.3% | 50.0 | 87.9% | 48.2 | 91.2% | 117.0 | 85.0% | 138.0 | 82.8% | 130.2 | 87.1% |
| 38.0 | 88.2% | 51.0 | 87.9% | 49.2 | 91.1% | 118.0 | 84.9% | 139.0 | 82.8% | 131.2 | 87.0% |
| 39.0 | 88.1% | 52.0 | 87.8% | 50.2 | 91.0% | 119.0 | 84.9% | 140.0 | 82.7% | 132.2 | 87.0% |
| 40.0 | 88.1% | 53.0 | 87.8% | 51.2 | 90.9% | 120.0 | 84.9% | 141.0 | 82.7% | 133.2 | 87.0% |
| 41.0 | 88.0% | 54.0 | 87.7% | 52.2 | 90.8% | 121.0 | 84.9% | 142.0 | 82.6% | 134.2 | 86.9% |
| 42.0 | 88.0% | 55.0 | 87.7% | 53.2 | 90.8% | 122.0 | 84.9% | 143.0 | 82.7% | 135.2 | 86.9% |
| 43.0 | 87.9% | 58.0 | 87.5% | 54.2 | 90.7% | 123.0 | 84.9% | 144.0 | 82.6% | 136.2 | 86.8% |
| 44.0 | 87.8% | 59.0 | 87.4% | 55.2 | 90.7% | 124.0 | 84.9% | 145.0 | 82.6% | 137.2 | 86.8% |
| 45.0 | 87.8% | 62.0 | 87.3% | 58.2 | 90.6% | 125.0 | 84.9% | 146.0 | 82.6% | 138.2 | 86.7% |
| 46.0 | 87.7% | 63.0 | 87.2% | 59.2 | 90.5% | 126.0 | 84.8% | 147.0 | 82.5% | 139.2 | 86.7% |
| 47.0 | 87.7% | 64.0 | 87.2% | 60.2 | 90.5% | 127.0 | 84.8% | 148.0 | 82.4% | 140.2 | 86.7% |
| 48.0 | 87.5% | 65.0 | 87.1% | 61.2 | 90.4% | 128.0 | 84.8% | 149.0 | 82.3% | 141.2 | 86.7% |
| 49.0 | 87.7% | 66.0 | 87.1% | 62.2 | 90.4% | 129.0 | 84.9% | 150.0 | 82.1% | 142.2 | 86.6% |
| 50.0 | 87.7% | 67.0 | 87.1% | 63.2 | 90.3% | 130.0 | 84.9% | 151.0 | 82.0% | 143.2 | 86.5% |
| 51.0 | 87.6% | 68.0 | 87.0% | 64.2 | 90.3% | 131.0 | 84.9% | 153.0 | 81.9% | 144.2 | 86.5% |
| 52.0 | 87.6% | 69.0 | 87.0% | 65.2 | 90.2% | 134.0 | 84.8% | 154.0 | 81.8% | 145.2 | 86.5% |
| 53.0 | 87.6% | 70.0 | 86.9% | 66.2 | 90.2% | 135.0 | 84.7% | 155.0 | 81.8% | 146.2 | 86.4% |
| 54.0 | 87.5% | 71.0 | 86.9% | 67.2 | 90.2% | 136.0 | 84.7% | 156.0 | 81.7% | 147.2 | 86.3% |
| 55.0 | 87.4% | 72.0 | 86.8% | 68.2 | 90.2% | 137.0 | 84.7% | 158.0 | 81.5% | 148.2 | 86.1% |
| 56.0 | 87.3% | 73.0 | 86.7% | 69.2 | 90.2% | 138.0 | 84.7% | 159.0 | 81.5% | 149.2 | 85.9% |
| 57.0 | 87.2% | 74.0 | 86.5% | 70.2 | 90.1% | 139.0 | 84.6% | 160.0 | 81.4% | 150.2 | 85.9% |
| 58.0 | 87.2% | 75.0 | 86.4% | 71.2 | 90.1% | 140.0 | 84.6% | 161.0 | 81.4% | 151.2 | 85.9% |
| 59.0 | 87.1% | 76.0 | 86.3% | 72.2 | 90.0% | 141.0 | 84.6% | 162.0 | 81.3% | 154.2 | 85.7% |
| 62.0 | 87.0% | 77.0 | 86.2% | 73.2 | 89.9% | 142.0 | 84.6% | 163.0 | 81.3% | 155.2 | 85.6% |
| 63.0 | 86.9% | 78.0 | 86.2% | 74.2 | 89.7% | 143.0 | 84.6% | 164.0 | 81.3% | 156.2 | 85.6% |
| 64.0 | 86.8% | 79.0 | 86.2% | 75.2 | 89.5% | 144.0 | 84.6% | 165.0 | 81.2% | 157.2 | 85.5% |
| 65.0 | 86.7% | 82.0 | 86.0% | 76.2 | 89.4% | 145.0 | 84.5% | 166.0 | 81.1% | 158.2 | 85.5% |
| 66.0 | 86.7% | 83.0 | 85.9% | 77.2 | 89.1% | 146.0 | 84.6% | 167.0 | 81.1% | 159.2 | 85.4% |
| 67.0 | 86.6% | 86.0 | 85.7% | 78.2 | 89.2% | 147.0 | 84.5% | 168.0 | 81.1% | 160.2 | 85.4% |
| 68.0 | 86.5% | 87.0 | 85.7% | 79.2 | 89.2% | 148.0 | 84.5% | 169.0 | 81.0% | 161.2 | 85.3% |
| 69.0 | 86.4% | 88.0 | 85.6% | 82.2 | 88.9% | 149.0 | 84.5% | 170.0 | 80.9% | 162.2 | 85.2% |
| 70.0 | 86.5% | 89.0 | 85.5% | 83.2 | 88.9% | 150.0 | 84.4% | 171.0 | 80.8% | 163.2 | 85.2% |
| 71.0 | 86.4% | 90.0 | 85.5% | 84.2 | 88.7% | 151.0 | 84.3% | 172.0 | 80.7% | 164.2 | 85.2% |
| 72.0 | 86.4% | 91.0 | 85.4% | 85.2 | 88.7% | 152.0 | 84.3% | 173.0 | 80.6% | 165.2 | 85.2% |
| 73.0 | 86.3% | 92.0 | 85.4% | 86.2 | 88.7% | 153.0 | 84.3% | 174.0 | 80.5% | 166.2 | 85.1% |
| 74.0 | 86.3% | 93.0 | 85.3% | 87.2 | 88.6% | 154.0 | 84.2% | 175.0 | 80.3% | 167.2 | 85.1% |
| 75.0 | 86.3% | 94.0 | 85.3% | 88.2 | 88.6% | 155.0 | 84.2% | 178.0 | 80.2% | 168.2 | 85.0% |
| 76.0 | 86.2% | 95.0 | 85.2% | 89.2 | 88.5% | 158.0 | 84.3% | 179.0 | 80.1% | 169.2 | 85.0% |
| 77.0 | 86.2% | 96.0 | 85.2% | 90.2 | 88.5% | 159.0 | 84.3% | 182.0 | 79.8% | 170.2 | 84.8% |
| 78.0 | 86.2% | 97.0 | 85.2% | 91.2 | 88.5% | 160.0 | 84.3% | 183.0 | 79.7% | 171.2 | 84.7% |
| 79.0 | 86.1% | 98.0 | 85.2% | 92.2 | 88.4% | 161.0 | 84.2% | 184.0 | 79.5% | 172.2 | 84.7% |
| 80.0 | 86.0% | 99.0 | 85.1% | 93.2 | 88.4% | 162.0 | 84.2% | 185.0 | 79.4% | 173.2 | 84.6% |
| 81.0 | 86.0% | 100.0 | 85.0% | 94.2 | 88.4% | 163.0 | 84.2% | 186.0 | 79.4% | 174.2 | 84.6% |
| 82.0 | 85.9% | 101.0 | 85.0% | 95.2 | 88.3% | 164.0 | 84.2% | 187.0 | 79.3% | 175.2 | 84.5% |
| 83.0 | 85.8% | 102.0 | 84.9% | 96.2 | 88.3% | 165.0 | 84.1% | 188.0 | 79.2% | 178.2 | 84.4% |
| 86.0 | 85.6% | 103.0 | 84.8% | 97.2 | 88.3% | 166.0 | 84.0% | 189.0 | 79.1% | 179.2 | 84.4% |
| 87.0 | 85.5% | 105.0 | 84.7% | 98.2 | 88.2% | 167.0 | 83.9% | 190.0 | 79.1% | 180.2 | 84.3% |
| 88.0 | 85.4% | 106.0 | 84.7% | 99.2 | 88.1% | 168.0 | 83.8% | 191.0 | 79.1% | 181.2 | 84.2% |
| 89.0 | 85.4% | 107.0 | 84.6% | 100.2 | 88.1% | 169.0 | 83.9% | 192.0 | 79.0% | 182.2 | 84.1% |
| 90.0 | 85.4% | 108.0 | 84.6% | 101.2 | 88.0% | 170.0 | 83.9% | 193.0 | 78.9% | 183.2 | 84.0% |
| 91.0 | 85.3% | 110.0 | 84.5% | 102.2 | 88.1% | 171.0 | 83.8% | 195.0 | 78.7% | 184.2 | 84.0% |
| 92.0 | 85.3% | 111.0 | 84.4% | 103.2 | 88.2% | 172.0 | 83.8% | 196.0 | 78.7% | 185.2 | 83.9% |
| 93.0 | 85.3% | 112.0 | 84.4% | 106.2 | 88.0% | 173.0 | 83.8% | 197.0 | 78.6% | 186.2 | 83.8% |
| 94.0 | 85.3% | 113.0 | 84.5% | 107.2 | 87.8% | 174.0 | 83.7% | 198.0 | 78.4% | 187.2 | 83.9% |
| 95.0 | 85.4% | 114.0 | 84.4% | 108.2 | 87.8% | 175.0 | 83.6% | 199.0 | 78.3% | 188.2 | 83.9% |
| 96.0 | 85.4% | 115.0 | 84.4% | 109.2 | 87.9% | 176.0 | 83.5% | 202.0 | 78.0% | 189.2 | 83.9% |
| 97.0 | 85.4% | 116.0 | 84.3% | 110.2 | 88.0% | 177.0 | 83.3% | 203.0 | 77.9% | 190.2 | 83.9% |
| 98.0 | 85.4% | 117.0 | 84.3% | 111.2 | 88.0% | 178.0 | 83.4% | 206.0 | 77.6% | 191.2 | 83.8% |
| 99.0 | 85.4% | 118.0 | 84.2% | 112.2 | 88.0% | 179.0 | 83.2% | 207.0 | 77.5% | 192.2 | 83.7% |
| 100.0 | 85.5% | 119.0 | 84.2% | 113.2 | 88.0% | 182.0 | 83.1% | 208.0 | 77.4% | 193.2 | 83.7% |
| 101.0 | 85.4% | 120.0 | 84.1% | 114.2 | 87.9% | 183.0 | 83.0% | 209.0 | 77.3% | 195.2 | 83.5% |
| 102.0 | 85.3% | 121.0 | 83.9% | 115.2 | 87.9% | 184.0 | 82.9% | 210.0 | 77.3% | 196.2 | 83.4% |
| 103.0 | 85.2% | 122.0 | 83.9% | 116.2 | 87.9% | 185.0 | 82.9% | 211.0 | 77.2% | 197.2 | 83.4% |
| 104.0 | 85.2% | 123.0 | 83.8% | 117.2 | 87.8% | 186.0 | 82.9% | 212.0 | 77.1% | 198.2 | 83.4% |
| 105.0 | 85.2% | 124.0 | 83.7% | 118.2 | 87.8% | 187.0 | 82.8% | 213.0 | 77.0% | 199.2 | 83.3% |
| 106.0 | 85.1% | 125.0 | 83.7% | 119.2 | 87.8% | 188.0 | 82.8% | 214.0 | 77.0% | 202.2 | 83.2% |
| 107.0 | 85.1% | 126.0 | 83.6% | 120.2 | 87.7% | 189.0 | 82.9% | 215.0 | 76.9% | 203.2 | 83.2% |
| 110.0 | 85.1% | 127.0 | 83.5% | 121.2 | 87.5% | 190.0 | 82.8% | 216.0 | 76.8% | 204.2 | 83.1% |
| 111.0 | 85.1% | 130.0 | 83.3% | 122.2 | 87.5% | 191.0 | 82.7% | | | 205.2 | 83.0% |
| 112.0 | 85.1% | 131.0 | 83.3% | 123.2 | 87.4% | 192.0 | 82.7% | | | 206.2 | 83.0% |
| 113.0 | 85.1% | 134.0 | 83.1% | 124.2 | 87.3% | 193.0 | 82.8% | | | 207.2 | 82.9% |
| 114.0 | 85.0% | 135.0 | 83.0% | 125.2 | 87.3% | 194.0 | 82.7% | | | 208.2 | 82.9% |
| 115.0 | 85.0% | 136.0 | 82.9% | 126.2 | 87.2% | 195.0 | 82.7% | | | 209.2 | 82.9% |

TABLE 3-continued

Results of Propylene Conversion Test Under "Test Conditions 1"

| (hr) | Commercial SPA Catalyst A | (hr) | Commercial SPA Catalyst B | (hr) | Commercial SPA Catalyst C |
|---|---|---|---|---|---|
| 196.0 | 82.7% |  |  | 210.2 | 82.8% |
| 197.0 | 82.6% |  |  | 211.2 | 82.7% |
| 198.0 | 82.6% |  |  | 212.2 | 82.7% |
| 199.0 | 82.5% |  |  | 213.2 | 82.6% |
| 200.0 | 82.4% |  |  | 214.2 | 82.6% |
| 201.0 | 82.2% |  |  | 215.4 | 82.6% |
| 202.0 | 82.0% |  |  | 216.2 | 82.6% |
| 203.0 | 81.9% |  |  |  |  |
| 206.0 | 81.8% |  |  |  |  |
| 207.0 | 81.7% |  |  |  |  |
| 208.0 | 81.7% |  |  |  |  |
| 209.0 | 81.6% |  |  |  |  |
| 210.0 | 81.5% |  |  |  |  |
| 211.0 | 81.5% |  |  |  |  |
| 212.0 | 81.4% |  |  |  |  |
| 213.0 | 81.5% |  |  |  |  |
| 214.0 | 81.2% |  |  |  |  |
| 215.0 | 81.5% |  |  |  |  |
| 216.0 | 81.5% |  |  |  |  |

Example 2

Figure 2:
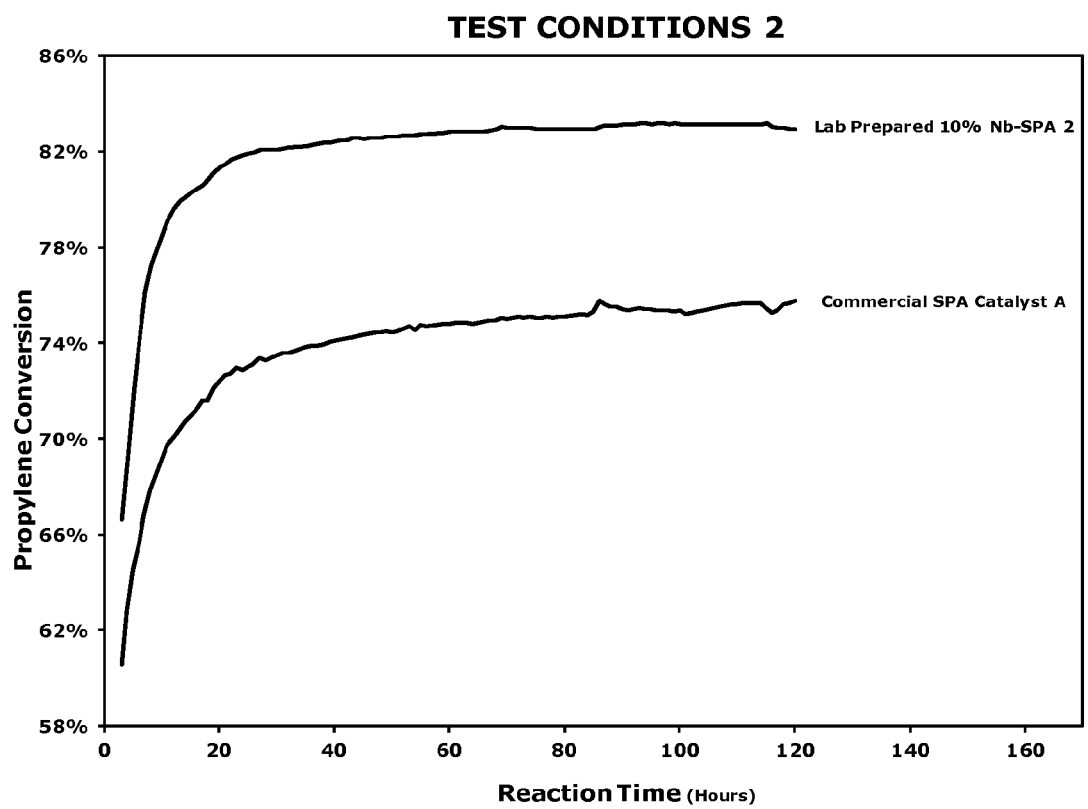
FIG. 2: Comparison of propylene oligomerization performance between a niobium promoted SPA catalyst according to the present invention and a commercial catalyst material that was not promoted by niobic acid.

The "Lab-Prepared 10% Nb-SPA 2" (sample (2) described above) and "Commercial SPA Catalyst A" were tested in a standard propylene oligomerization performance test under "Test Conditions 2" as described in Table 1 above. The results are provided in FIG. 2 and Table 4 below.

TABLE 4

Results of Propylene Conversion Test Under "Test Conditions 2"

| (hr) | Commercial SPA Catalyst A | (hr) | Lab Prepared 10% Nb-SPA 2 |
|---|---|---|---|
| 3.0 | 60.6% | 3.2 | 66.6% |
| 4.0 | 62.8% | 4.2 | 69.2% |
| 5.0 | 64.5% | 5.2 | 72.0% |
| 6.0 | 65.6% | 6.2 | 74.4% |
| 7.0 | 66.8% | 7.2 | 76.1% |
| 8.0 | 67.8% | 8.2 | 77.3% |
| 11.0 | 69.7% | 11.2 | 79.2% |
| 12.0 | 70.0% | 12.2 | 79.6% |
| 13.0 | 70.4% | 13.2 | 79.9% |
| 14.0 | 70.7% | 14.2 | 80.1% |
| 15.0 | 70.9% | 15.2 | 80.3% |
| 16.0 | 71.2% | 16.2 | 80.4% |
| 17.0 | 71.6% | 17.2 | 80.6% |
| 18.0 | 71.6% | 18.2 | 80.8% |
| 19.0 | 72.1% | 19.2 | 81.1% |
| 20.0 | 72.4% | 20.2 | 81.3% |
| 21.0 | 72.7% | 21.2 | 81.5% |
| 22.0 | 72.7% | 22.2 | 81.7% |
| 23.0 | 73.0% | 23.2 | 81.8% |
| 24.0 | 72.9% | 24.2 | 81.8% |
| 25.0 | 73.0% | 25.2 | 81.9% |
| 26.0 | 73.1% | 26.2 | 82.0% |
| 27.0 | 73.4% | 27.2 | 82.1% |
| 28.0 | 73.3% | 28.2 | 82.1% |
| 29.0 | 73.4% | 29.2 | 82.1% |
| 30.0 | 73.5% | 30.2 | 82.1% |
| 31.0 | 73.6% | 31.2 | 82.1% |
| 32.0 | 73.6% | 32.2 | 82.2% |
| 35.0 | 73.8% | 35.2 | 82.3% |
| 36.0 | 73.9% | 36.2 | 82.3% |
| 37.0 | 73.9% | 37.2 | 82.3% |
| 38.0 | 74.0% | 38.2 | 82.4% |
| 39.0 | 74.0% | 39.2 | 82.4% |
| 40.0 | 74.1% | 40.2 | 82.4% |
| 41.0 | 74.1% | 41.2 | 82.5% |

TABLE 4-continued

Results of Propylene Conversion Test Under "Test Conditions 2"

| (hr) | Commercial SPA Catalyst A | (hr) | Lab Prepared 10% Nb-SPA 2 |
|---|---|---|---|
| 42.0 | 74.2% | 42.2 | 82.5% |
| 43.0 | 74.2% | 43.2 | 82.6% |
| 44.0 | 74.3% | 44.2 | 82.6% |
| 45.0 | 74.3% | 45.2 | 82.6% |
| 46.0 | 74.4% | 46.2 | 82.6% |
| 47.0 | 74.5% | 47.2 | 82.6% |
| 48.0 | 74.5% | 48.2 | 82.6% |
| 49.0 | 74.5% | 49.2 | 82.6% |
| 50.0 | 74.4% | 50.2 | 82.6% |
| 51.0 | 74.5% | 51.2 | 82.7% |
| 52.0 | 74.6% | 52.2 | 82.7% |
| 53.0 | 74.7% | 53.2 | 82.7% |
| 54.0 | 74.6% | 54.2 | 82.7% |
| 55.0 | 74.7% | 55.2 | 82.7% |
| 56.0 | 74.7% | 56.2 | 82.8% |
| 59.0 | 74.8% | 59.2 | 82.8% |
| 60.0 | 74.8% | 60.2 | 82.8% |
| 61.0 | 74.8% | 61.2 | 82.8% |
| 62.0 | 74.9% | 62.2 | 82.9% |
| 63.0 | 74.8% | 63.2 | 82.8% |
| 64.0 | 74.8% | 64.2 | 82.8% |
| 65.0 | 74.9% | 65.2 | 82.8% |
| 66.0 | 74.9% | 66.2 | 82.9% |
| 67.0 | 75.0% | 67.2 | 82.9% |
| 68.0 | 75.0% | 68.2 | 82.9% |
| 69.0 | 75.0% | 69.2 | 83.1% |
| 70.0 | 75.0% | 70.2 | 83.0% |
| 71.0 | 75.0% | 71.2 | 83.0% |
| 72.0 | 75.1% | 72.2 | 83.0% |
| 73.0 | 75.1% | 73.2 | 83.0% |
| 74.0 | 75.1% | 74.2 | 83.0% |
| 75.0 | 75.0% | 75.2 | 83.0% |
| 76.0 | 75.1% | 76.2 | 82.9% |
| 77.0 | 75.1% | 77.2 | 82.9% |
| 78.0 | 75.1% | 78.2 | 83.0% |
| 79.0 | 75.1% | 79.2 | 83.0% |
| 80.0 | 75.1% | 80.2 | 82.9% |
| 83.0 | 75.2% | 83.2 | 83.0% |
| 84.0 | 75.2% | 84.2 | 83.0% |
| 85.0 | 75.3% | 85.2 | 83.0% |
| 86.0 | 75.8% | 86.2 | 83.0% |
| 87.0 | 75.6% | 87.2 | 83.1% |
| 88.0 | 75.5% | 88.2 | 83.1% |
| 89.0 | 75.5% | 89.2 | 83.1% |
| 90.0 | 75.4% | 90.2 | 83.1% |
| 91.0 | 75.4% | 91.2 | 83.1% |
| 92.0 | 75.4% | 92.2 | 83.2% |
| 93.0 | 75.4% | 93.2 | 83.2% |
| 94.0 | 75.4% | 94.2 | 83.2% |
| 95.0 | 75.4% | 95.2 | 83.2% |
| 96.0 | 75.4% | 96.2 | 83.2% |
| 97.0 | 75.4% | 97.2 | 83.2% |
| 98.0 | 75.4% | 98.2 | 83.1% |
| 99.0 | 75.3% | 99.2 | 83.2% |
| 100.0 | 75.3% | 100.2 | 83.1% |
| 101.0 | 75.2% | 101.2 | 83.2% |
| 102.0 | 75.3% | 102.2 | 83.1% |
| 103.0 | 75.3% | 103.2 | 83.2% |
| 104.0 | 75.4% | 104.2 | 83.1% |
| 107.0 | 75.5% | 107.2 | 83.1% |
| 108.0 | 75.6% | 108.2 | 83.1% |
| 109.0 | 75.6% | 109.2 | 83.1% |
| 110.0 | 75.6% | 110.2 | 83.1% |
| 111.0 | 75.6% | 111.2 | 83.1% |
| 112.0 | 75.7% | 112.2 | 83.1% |
| 113.0 | 75.7% | 113.2 | 83.1% |
| 114.0 | 75.7% | 114.2 | 83.1% |
| 115.0 | 75.5% | 115.2 | 83.2% |
| 116.0 | 75.2% | 116.2 | 83.0% |
| 117.0 | 75.4% | 117.2 | 83.0% |
| 118.0 | 75.6% | 118.2 | 83.0% |
| 119.0 | 75.6% | 119.2 | 83.0% |
| 120.0 | 75.8% | 120.2 | 83.0% |

Although the present invention has been described in connection with specific embodiments, it should be understood that the invention as claimed should not be unduly limited to such specific embodiments. Indeed, various modifications and variations of the described compositions and methods of the invention will be apparent to those of ordinary skill in the art and are intended to be within the scope of the appended claims.

What is claimed is:

1. A solid phosphoric acid catalyst, comprising:
   an amount of silicon orthophosphate and, optionally, an amount of silicon pyrophosphate, having an integrated XRD reflectance intensity ratio of silicon orthophosphate to silicon pyrophosphate of at least about 5:1, and
   a promoter comprising niobium, titanium, zirconium, tungsten, vanadium, chromium, molybdenum, aluminum, boron, or any mixture thereof.

2. The catalyst of claim 1, wherein the promoter comprises niobic acid.

3. The solid phosphoric acid catalyst of claim 1, in the form of a calcined extrudate.

4. A process of preparing the solid phosphoric acid catalyst of claim 1, comprising the steps of: mixing a phosphorus source, a silicon source, and a promoter; forming the mixture into a shape; and calcining the formed shape.

5. The process of claim 4, wherein the phosphorus source, the silicon source, and the promoter are mixed at a temperature of about 10° C. to about 250° C.

6. The process of claim 4, wherein the phosphorus source and the silicon source are present in the mixture in a ratio of about 2:1 to about 4:1.

7. The process of claim 4, wherein the promoter is present in the mixture at a concentration of about 5% to about 10% w/w of the silicon source.

8. The process of claim 4, wherein the formed shape is calcined at a temperature of about 200° C. to about 500° C.

9. The process of claim 4, wherein the phosphorus source comprises phosphoric acid, a compound that forms phosphoric acid by hydrolysis, or any mixture thereof, the silicon source comprises a natural or artificial porous siliceous material, and the promoter comprises niobium, titanium, zirconium, tungsten, vanadium, chromium, molybdenum, aluminum, boron, or any mixture thereof.

10. The process of claim 9, wherein the phosphorus source comprises orthophosphoric acid, pyrophosphoric acid, or any mixture thereof, the silicon source comprises diatomaceous earth, infusorial earth, ciliate earth, kieselguhr, kaolin, fuller's earth, artificial porous silica, or any mixture thereof, and the promoter comprises niobic acid.

11. A process of converting hydrocarbons catalyzed by the solid phosphoric acid catalyst of claim 1, comprising providing a hydrocarbon feedstock at hydrocarbon conversion conditions and contacting the feedstock with said solid phosphoric acid catalyst.

12. The process of claim 11, comprising alkylating an aromatic hydrocarbon or oligomerizing an olefin.

13. The process of claim 12, wherein the olefin comprises propylene or butylene.

* * * * *